United States Patent [19]

Kratel et al.

[11] 4,085,087

[45] Apr. 18, 1978

[54] METHOD OF REDUCING STATIC ELECTRICITY IN PLASTIC COMPOSITIONS AND ANTISTATIC COMPOSITIONS

[75] Inventors: Günter Kratel, Durach-Bechen; Johann Bauer; Engelbert Pichler, both of Burghausen; Hans-Peter Kalmuk, Kempten, all of Germany

[73] Assignee: Wacker Chemie GmbH, Munich, Germany

[21] Appl. No.: 610,535

[22] Filed: Sep. 5, 1975

[30] Foreign Application Priority Data

Sep. 9, 1974 Germany .............................. 2443075

[51] Int. Cl.² ................................................ C08K 3/22
[52] U.S. Cl. .............................. 260/42.49; 260/2 EP; 260/37 R; 260/37 N; 260/37 EP; 260/37 SB; 260/37 PC; 260/38; 260/40 R; 260/42.27; 260/42.43; 260/42.46; 260/42.47; 260/42.52; 260/46.5 R; 260/59 R; 260/71; 260/75 T; 260/77.5 A; 260/77.5 D; 260/785; 260/756; 260/DIG. 16; 526/2

[58] Field of Search ..................... 260/DIG. 16, 42.43, 260/37 R, 37 N, 37 PC, 38, 40 R, 37 SB, 37 EP, 42.46, 42.47, 42.49, 42.27, 42.52, 2 EP, 46.5 R, 59 R, 71, 75 T, 77.5 A, 77.5 D, 785, 756; 526/2

[56] References Cited

U.S. PATENT DOCUMENTS

| | | | |
|---|---|---|---|
| 2,867,645 | 1/1959 | Eijk et al. ..................... | 260/DIG. 16 |
| 2,917,401 | 12/1959 | Noguchi et al. ............. | 260/DIG. 16 |
| 3,973,972 | 8/1976 | Muller ................................... | 106/35 |

FOREIGN PATENT DOCUMENTS 2,310,009  9/1973  Germany ................................ 526/2

*Primary Examiner*—James H. Derrington
*Attorney, Agent, or Firm*—Hammond & Littell

[57] ABSTRACT

A method of reducing the electrostatic charge aquired by a plastic composition by incorporating therein an antistatically effective amount of a mixed oxide of phosphorus and one or more metals selected from the group consisting of silicon, aluminum, titanium and iron, said mixed oxide having been prepared by flame hydrolysis; as well as the plastic composition containing said mixed oxide.

24 Claims, No Drawings

METHOD OF REDUCING STATIC ELECTRICITY IN PLASTIC COMPOSITIONS AND ANTISTATIC COMPOSITIONS

THE PRIOR ART

A major disadvantage of a large number of plastics materials is their tendency to acquire an electrostatic charge. Such a charge can be generated, for example, by the effect of friction within a powder or granulate as the particles or granules move against one another. The frictional forces that occur during the transportation of powders or granulates can be sufficient to impart a substantial electrostatic charge to the material. Far greater frictional forces occur, however, when additives are mixed into a plastics powder in a high-speed mixer.

The electrostatic charge can impair the flow properties of a plastic powder or granules, giving rise, for example, to bridge formation. This can make it difficult to feed the material in a smooth manner into a processing machine. The presence of an electrostatic charge can also hinder the determination of the characteristic data of an unmolded plastics material, or it can result in the obtention of incorrect and unreproducible values. Electrostatic charges on finished plastics articles are discharged when the article is touched. This may be unpleasant and might even cause technical disturbances or be a safety threat.

Various organic substances have been incorporated into plastics materials as antistatic agents. A disadvantage of many of these is that they have a good antistatic effect within only a narrow concentration range. Another disadvantage is that they can result in changes in the properties of the plastics material. For example, they may give it a poor thermostability or may alter its flow behaviour in the thermoplastic range.

Carbon black has also been used in plastics materials as an antistatic agent. Although it can have a good antistatic effect, its color, which masks other colored additives in the material, detracts from its usefulness. In practice, it is of no use for commercial purposes. It can be used in plastics materials for laboratory research, but even then it makes the apparatus extremely dirty.

Highly-dispersed silicic acid has also been used as an antistatic agent, but it does not give an adequate effect when incorporated into plastics materials.

OBJECTS OF THE INVENTION

An object of the present invention is the development, in the method of reducing the electrostatic charge acquired by a plastic composition comprising the step of incorporating an antistatically-effective amount of an antistatic agent in said plastic composition, the improvement consisting essentially of using an antistatically-effective amount of a mixed oxide of phosphorus and one or more metals selected from the group consisting of silicon, aluminum, titanium and iron, said mixed oxide having been prepared by flame hydrolysis, as said antistatic agent.

Another object of the present invention is the development of a plastic composition comprising a plastic material subject to acquiring an electrostatic charge and intimately mixed therewith an antistatically-effective amount of a mixed oxide of phosphorus and one or more metals selected from the group consisting of silicon, aluminum, titanium and iron, said mixed oxide having been prepared by flame hydrolysis.

These and other objects of the invention will become more apparent as the description thereof proceeds.

DESCRIPTION OF THE INVENTION

The present invention provides a plastics material containing, as an antistatic agent, a mixed oxide of phosphorus and one or more metals selected from silicon, aluminum, titanium, and iron, the mixed oxide having been prepared by flame hydrolysis.

The presence of the mixed oxide in the plastics material, even in only small amounts, can substantially reduce the tendency of the material to acquire an electrostatic charge or even prevent them from becoming charged.

Silicon is sometimes regarded as a metal and sometimes as a non-metal. For the purposes of the present specification, the term "metal" is intended to include silicon.

The mixed oxide antistatic material can be intimately mixed with the plastic particles before other materials are added thereto, or it can be added together with customary plastic additives.

More particularly, therefore, the present invention relates to, in the method of reducing the electrostatic charge acquired by a plastic composition comprising the step of incorporating an antistatically-effective amount of an antistatic agent in said plastic composition, the improvement consisting essentially of using an antistatically-effective amount of a mixed oxide of phosphorus and one or more metals selected from the group consisting of silicon, aluminum, titanium and iron, said mixed oxide having been prepared by flame hydrolysis, as said antistatic agent; as well as a plastic composition comprising a plastic material subject to acquiring an electrostatic charge and intimately mixed therewith an antistatically-effective amount of a mixed oxide of phosphorus and one or more metals selected from the group consisting of silicon, aluminum, titanium and iron, said mixed oxide having been prepared by flame hydrolysis.

The mixed oxides used according to the invention can conveniently be prepared from a mixture of (i) phosphorus and/or a phosphorus compound, and (ii) one or more metals or compounds selected from silicon compounds, aluminum, aluminum compounds, titanium, titanium compounds, iron, and iron compounds. Such a mixture can be used in conventional process for the preparation of pyrogenically produced oxides by combustion of metals and/or metal compounds in a flame, for example a propane/air or hydrogen/air flame. The substances may be fed to the flame in solid, liquid or vapor form, optionally with the addition of water. Processes of this type are described in, for example, Ullmann's *Encyclopadie der technischen Chemie,* Munich-Berlin, 1964, vol. 15, p. 726.

Volatile phosphorus compounds are advantageously used for the preparation of the mixed oxides. An advantage of the use of such compounds is, in many cases, their easy accessibility. Another advantage is that the preparation of the mixed oxides can be easier when using such compounds. Examples of suitable volatile phosphorus compounds are phosphorus trichloride, phosphorus pentachloride, phosphorus oxychloride, and phosphoric acid trimethyl ester. The silicon, titanium, aluminum and iron compounds used are advantageously the chlorides. The volatile phosphorus compound and the other metal compound or compounds are advantageously reacted in the presence of water produced in situ at a temperature of at least 800° C, namely by so-called flame hydrolysis. The mixed oxides produced in this manner generally have a BET surface area of from 15 to 400 m$^2$/gm (measured by nitrogen absorption as described in ASTM Special Technical Bulletin No. 51, 1941, p. 95).

Mixed oxides of phosphorus and silicon or of phosphorus and titanium are preferred. These have the advantage of being easily accessible and of being colorless.

The phosphorus content of the mixed oxide is advantageously from 0.1 to 30% by weight, preferably from 3 to 15% by weight, calculated as elementary phosphorus.

The essential constituent of the mixed oxides appears to be, in particular, phosphorus oxide.

The mixed oxides can be incorporated into a wide variety of plastics materials in order to reduce the tendency of the material to acquire an electrostatic charge or in order to prevent it from acquiring such a charge. The plastics material may be in the form of, for example, a plastics powder, a plastics granulate, a foamable plastics material, or a finished article. Examples of plastics materials into which the mixed oxides can be incorporated are thermoplastics such as vinyl chloride homopolymers and copolymers, polyvinyl esters, polyolefins (e.g. polyethylene and polypropylene), copolymers of olefins with other olefinically unsaturated monomers, polyfluorohydrocarbons, aromatic vinyl polymers (e.g. polystyrene and polyvinylpyridine), polyamides, polyurethanes, polycarbonates, and thermosetting plastics such as formaldehyde polycondensates (e.g. melamine-formaldehyde, urea-formaldehyde, and phenol-formaldehyde polycondensates), resins (e.g., polyester resins, epoxide resins, silicon resins), and also rubber; and mixtures of any two or more thereof.

The mixed oxides can be incorporated into the plastics materials, which is advantageously in the form of a powder or granulate, by using conventional mixer apparatus, for example, drum mixers, high-speed mixers, and force mixers. If other components, for example, stabilizers, pigments, dyes, processing auxiliaries, fillers, and modifying resins, are being added to the plastics material, the mixed oxides can be added in the same processing step.

The mixed oxides can, moreover, be admixed with various conventional fillers, prior to incorporation in the plastics material. They can, for example, be mixed with silicate fillers, siliceous chalk, highly-dispersed silicic acid, chalk, magnesite, phosphates, and metal oxides, for example, titanium oxide, iron oxide, and aluminum oxide. These fillers may be used in amounts of up to 80% by weight.

The mixed oxides may be incorporated in the plastics materials in amounts of from 0.05 to 80% by weight, advantageously from 0.1 to 50% by weight. For incorporation in plastics powders and granulates, amounts of from 0.05 to 2% by weight, preferably from 0.1 to 0.3% by weight, are generally suitable for reducing the tendency of the material to acquire an electrostatic charge or for preventing it from acquiring such a charge.

The trickling, flowing and moving properties of the powders and granulates are improved by the presence of the mixed oxides. The powders and granulates can generally be transported and stored without undue difficulties arising from electrostatic charges. The materials can also be more easily fed into extruders, injection molding machines, and other processing machines, with the result that higher production rates can be attained than those attained when using plastics materials without the mixed oxides. The powdery materials can also be examined without difficulty in order to determine their characteristic data, and these data are reproducible. Thus, for example, a sieve analysis can be carried out without the initial expense of eliminating an electrostatic charge. Similarly, the vibration density and bulk densities can readily be determined. Moreover, the values for these characteristic data are increased. Semi-finished and finished articles produced from these powders and granulates containing the mixed oxides have a better antistatic behaviour than articles produced from powders and granulates not containing the mixed oxides. An antistatic effect on the complete article may be achieved at contents of from 1 to 5% by weight of mixed oxides.

As an alternative to incorporating the mixed oxides in small amounts of up to 5% by weight, it can be used as a filler in semi-finished and finished articles, for example, plates, films, articles from foamed materials, fleeces, woven goods, molded articles and molded parts. In this case, the mixed oxides may be used in amounts of from 5 to 80% by weight, advantageously from 20 to 50% by weight, calculated on the weight of plastics material. The mixed oxides can be incorporated into the plastics materials prior to processing, as previously described. Articles incorporating the mixed oxides do not generally acquire a substantial electrostatic charge.

The following examples are illustrative of the invention without being limitative in any respect.

EXAMPLES

Examples 1 and 2 illustrate the manufacture of mixed oxides used according to the invention. Examples 3 and 4 illustrate the antistatic effect of the mixed oxides when incorporated in plastics materials.

EXAMPLE 1

1 kg/h of silicon tetrachloride and 0.24 kg/h of phosphorus trichloride were vaporized and burned, in a combustion chamber, in a mixture of 0.5 m$^3$/h of propane and 12.6 m$^3$/h of air. The temperature in the combustion chamber was more than 800° C. The mixed oxide, produced pyrogenically in the gaseous phase in this manner, was separated off by means of a cyclone and freed of residue hydrogen chloride by heating to 200° C. The product had a phosphorus content of 8.5% by weight and a BET surface area of 53 m$^2$/g.

EXAMPLE 2

1.20 kg/h of titanium tetrachloride and 0.25 kg/h of phosphorus trichloride were vaporized, and burned in a mixture of 0.85 m$^3$/h of propane and 14.1 m$^3$/h air, in a combustion chamber, at a temperature of about 800° C. The resulting mixed oxide was separated off and heated to 200° C, as in Example 1. The product had a phosphorus content of 8.5% by weight and a BET surface area of 46 m$^2$/g.

EXAMPLE 3

0.1% by weight, respectively, of highly dispersed silicic acid, carbon black Corax B (Trade Mark), and the mixed oxide produced in Example 1 was added to samples of PVC powder (K-value 70). These three samples, and a fourth sample of PVC powder with no additives, were then shaken 50 times to give them an electrostatic charge. These four samples, together with a fifth sample of PVC powder with no additives, that had not been shaken, were then examined to determine their respective vibration density, bulk density, and trickling ability. The trickling ability was determined by measuring the time taken (in seconds) for a specified amount of the product to run through an 8mm funnel. The results are given in the following Table. They show the favorable antistatic effect of the mixed oxide as compared with that of the other, prior art, antistatic additives. (Electrostatically charged powders have a poorer trickling ability and lower vibration and bulk densities.)

|   | additive | shaken 50 times | vibration density | bulk density | trickling ability |
|---|---|---|---|---|---|
| (a) | none | no | 532 | 463 | 57 |
| (b) | none | yes | 472 | 395 | does not trickle |
| (c) | silicic acid | yes | 521 | 452 | 86 |
| (d) | carbon black | yes | 538 | 474 | 74 |
| (e) | mixed oxide | yes | 543 | 475 | 55 |

EXAMPLE 4

(i) A copolymer of vinyl chloride and vinyl acetate (K-value 50), and (ii) a graft polymer of polyvinyl chloride and ethylene/vinyl acetate copolymer (K-value 68), each containing no antistatic additive, were each subjected for one hour to vibration through a sieve, without having been subjected to previous treatment. No sieve analysis could be made for either product, because the majority of each product remained behind the second-largest-mesh screen (0.25/0.15 mm). This shows that the products acquired a considerable electrostatic charge as a result of the vibration. Sieving of the products by means of a current of air could, in principle, be carried out, but, in practice, the values obtained for the fine mesh sizes were too small.

Samples of the same two materials, each containing 0.1% by weight of the mixed oxide produced in Example 1, were subjected to sieve analysis by vibration and by current of air. In these cases, meaningful results were obtained. These are shown in the following Table.

| Polymer | Sieving method | % by weight retained on mesh sizes (mm) | | | | | | Duration (mins) |
|---|---|---|---|---|---|---|---|---|
| | | 0.25 | 0.15 | 0.1 | 0.063 | 0.04 | rest | |
| (i) | vibration | 11 | 40 | 34 | 11 | 2 | 2 | 20 |
| (i) | air | 6 | 39 | 39 | 13 | 1 | 2 | 50 |
| (ii) | vibration | — | 2 | 37 | 32 | 20 | 9 | 20 |
| (ii) | air | — | 2 | 35 | 32 | 25 | 6 | 51 |

The preceding specific embodiments are illustrative of the practice of the invention. It is to be understood, however, that other expedients known to those skilled in the art, or disclose herein, may be employed without departing from the spirit of the invention or the scope of the appended claims.

We claim:

1. In the method of reducing the electrostatic charge acquired by a plastic composition comprising the step of incorporating an antistatically-effective amount of an antistatic agent in said plastic composition, the improvement consisting essentially of using an antistatically-effective amount of a mixed oxide of phosphorus and one or more metals selected from the group consisting of silicon, aluminum, titanium and iron, said mixed oxide having been prepared by flame hydrolysis and having a BET surface area of from 15 to 400 m²/gm, as said antistatic agent.

2. The process of claim 1 wherein said mixed oxide has a phosphorus content of from 0.1 to 30% by weight.

3. The process of claim 2 wherein said mixed oxide has a phosphorus content of from 3 to 15% by weight.

4. The process of claim 1 wherein said antistatically-effective amount is from 0.05 to 80% by weight.

5. The process of claim 1 wherein said plastic composition is pulverulent and said antistatically-effective amount is from 0.05 to 2% by weight.

6. The process of claim 5 wherein said antistatically-effective amount is from 0.1 to 0.3% by weight.

7. The process of claim 1 wherein said plastic composition is shaped and said antistatically-effective amount is from 1 to 5% by weight.

8. The process of claim 1 wherein said plastic composition is shaped and said mixed oxide is employed both as a filler and as a antistatic agent in an amount of from 5 to 80% by weight.

9. The process of claim 1 wherein said mixed oxide is a mixed oxide of phosphorus and silicon.

10. The process of claim 1 wherein said mixed oxide is a mixed oxide of phosphorus and titanium.

11. A plastic composition comprising a plastic material subject to acquiring an electrostatic charge and intimately mixed therewith an antistatically-effective amount of a mixed oxide of phosphorus and one or more metals selected from the group consisting of silicon, aluminum, titanium and iron, said mixed oxide having been prepared by flame hydrolysis and having a BET surface area of from 15 to 400 m²/gm.

12. The composition of claim 11 wherein said mixed oxide has a phosphorus content of from 0.1 to 30% by weight.

13. The composition of claim 12 wherein said mixed oxide has a phosphorus content of from 3 to 15% by weight.

14. The composition of claim 11 wherein said antistatically-effective amount is from 0.05 to 80% by weight.

15. The composition of claim 11 wherein said plastic material is pulverulent and said antistatically-effective amount is from 0.05 to 2% by weight.

16. The composition of claim 15 wherein said antistatically-effective amount is from 0.1 to 0.3% by weight.

17. The composition of claim 11 wherein said plastic material is shaped and said antistatically-effective amount is from 1 to 5% by weight.

18. The composition of claim 1 wherein said plastic material is shaped and said mixed oxide is employed both as a filler and as an antistatic agent in an amount of from 5 to 80% by weight.

19. The composition of claim 11 wherein said mixed oxide is a mixed oxide of phosphorus and silicon.

20. The composition of claim 11 wherein said mixed oxide is a mixed oxide of phosphorus and titanium.

21. The process of claim 1 wherein said plastic composition is a vinyl chloride polymer selected from the group consisting of polyvinyl chloride and vinyl chloride copolymers.

22. The process of claim 1 wherein said plastic composition is a polymer selected from the group consisting of vinyl chloride polymers, polyvinyl esters, polyolefin polymers, polyfluorohydrocarbons, aromatic vinyl polymers, polyamides, polyurethanes, polycarbonates, formaldehyde polycondensates, polyester resins, epoxide resins, silicon resins, rubber and mixtures thereof.

23. The composition of claim 11 wherein said plastic composition is a vinyl chloride polymer selected from the group consisting of polyvinyl chloride and vinyl chloride copolymers.

24. The process of claim 11 wherein said plastic composition is a polymer selected from the group consisting of vinyl chloride polymers, polyvinyl esters, polyolefin polymers, polyfluorohydrocarbons, aromatic vinyl polymers, polyamides, polyurethanes, polycarbonates, formaldehyde polycondensates, polyester resins, epoxide resins, silicon resins, rubber and mixtures thereof.

* * * * *